(12) United States Patent
Lu et al.

(10) Patent No.: US 7,295,907 B2
(45) Date of Patent: Nov. 13, 2007

(54) RECOVERY OF CALIBRATED CENTER STEERING POSITION AFTER LOSS OF BATTERY POWER

(75) Inventors: Engelbert Lu, Ann Arbor, MI (US); Kevin McLaughlin, Troy, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 295 days.

(21) Appl. No.: 11/152,512

(22) Filed: Jun. 14, 2005

(65) Prior Publication Data

US 2006/0293818 A1    Dec. 28, 2006

(51) Int. Cl.
  *B62D 6/00* (2006.01)
(52) U.S. Cl. ............................. 701/41; 701/42; 116/31; 318/432; 318/561; 318/254; 180/443
(58) Field of Classification Search ............ 701/41–42; 116/31; 318/432, 561, 25; 180/443
  See application file for complete search history.

(56) References Cited

U.S. PATENT DOCUMENTS

| | | | | |
|---|---|---|---|---|
| 5,406,155 A | * | 4/1995 | Persson .................... | 310/68 B |
| 5,625,239 A | * | 4/1997 | Persson et al. ........... | 310/68 B |
| 5,663,616 A | * | 9/1997 | Stringfellow et al. ...... | 318/254 |
| 5,787,375 A | * | 7/1998 | Madau et al. .................. | 701/41 |
| 6,046,560 A | * | 4/2000 | Lu et al. ..................... | 318/432 |
| 6,107,767 A | * | 8/2000 | Lu et al. ..................... | 318/561 |
| 6,184,637 B1 | * | 2/2001 | Yamawaki et al. ......... | 318/432 |
| 6,354,396 B1 | * | 3/2002 | Horton et al. .............. | 180/446 |
| 6,364,050 B1 | | 4/2002 | Horton | |
| 6,665,598 B2 | * | 12/2003 | Nakano et al. ............... | 701/41 |
| 6,925,412 B2 | * | 8/2005 | Rauer et al. ................. | 702/151 |
| 6,976,555 B2 | * | 12/2005 | Husain et al. .............. | 180/443 |
| 6,983,647 B2 | * | 1/2006 | Nagaoka et al. ........... | 73/118.1 |
| 7,085,638 B2 | * | 8/2006 | Knoll .......................... | 701/41 |
| 7,149,615 B2 | * | 12/2006 | Ura ............................. | 701/41 |
| 7,215,112 B1 | * | 5/2007 | Recio et al. ............. | 324/207.2 |
| 2002/0022913 A1 | * | 2/2002 | Font .............................. | 701/41 |
| 2003/0144780 A1 | * | 7/2003 | Recker et al. ................ | 701/41 |
| 2004/0059486 A1 | * | 3/2004 | Takuma et al. ............... | 701/41 |
| 2005/0087121 A1 | * | 4/2005 | Brown et al. ................. | 116/31 |
| 2006/0241790 A1 | * | 10/2006 | Chen et al. ................... | 700/66 |

FOREIGN PATENT DOCUMENTS

| | | |
|---|---|---|
| EP | 1020344 | 7/2000 |
| EP | 1026068 | 8/2000 |
| JP | 2003070284 | 3/2003 |
| WO | WO 99/08374 | 2/1999 |

\* cited by examiner

*Primary Examiner*—Thomas Black
*Assistant Examiner*—Wae Lenny Louie
(74) *Attorney, Agent, or Firm*—MacMillan, Sobanski & Todd, LLC

(57) ABSTRACT

The steering angle of a vehicle is monitored using position sensors of an electric motor of an electric power assisted steering (EPAS) system. A position of the electric motor corresponding to the straight-ahead, center position of the steering system is stored in non-volatile memory during a steering calibration procedure, such as an end-of-line calibration in a vehicle assembly plant. Following power loss due to a dead battery, a steering angle zeroing procedure performed in a vehicle stability control (VSC) system generates a center position with enough accuracy to be within one electrical cycle of the motor. The pre-stored electric motor position is then used to determine the electrical cycle where the center position was located, and accurate monitoring of steering angle is resumed.

19 Claims, 4 Drawing Sheets

RECOVERY OF CALIBRATED CENTER STEERING POSITION AFTER LOSS OF BATTERY POWER

CROSS REFERENCE TO RELATED APPLICATIONS

Not applicable.

STATEMENT REGARDING FEDERALLY SPONSORED RESEARCH

Not Applicable.

BACKGROUND OF THE INVENTION

The present invention relates in general to maintaining an accurate steering angle position relative to a center steering angle of a motor vehicle, and more specifically to electric power assisted steering systems for vehicles wherein an electric motor operatively connected to a steering assembly includes position sensors for assisting in the determination of the steering angle.

It is well known to provide electric power assisted steering (EPAS) systems. A steering assembly typically comprises a hand wheel connected to a steering shaft which is operatively connected to one or more road wheels through a steering rack, although many different assemblies are in common use. Some EPAS systems use brushless electric motors with a motor position sensor to control the timing of switching (i.e., commutation of windings of the motor). The motor position sensor typically comprises an electromagnetic type switch or switches which change state whenever a magnet provided on the rotor passes the sensor. Alternatively, a magnetized disc can be mounted on the rotor shaft and the sensor may detect movement of the magnets on the disc.

A measure of vehicle steering angle position (i.e., the direction of the road wheels) relative to a straight-ahead or center steering angle is needed by various vehicle systems, such as suspension damper control systems, vehicle stability control systems, and lane guidance systems.

In a 3-phase brushless permanent magnet motor, for example, three Hall effect sensors can be located around the rotor in such a manner that a rough measurement of rotor electrical position can be obtained. However, this measurement alone is not sufficient for use as an indication of the position of the steering angle because 1) the electric motor goes through many complete electrical cycles as the steering system passes through its full range of motion, so the motor position output will repeat at different steering angles and thus produce an ambiguous signal (just as a steering shaft position sensor does), and 2) the angular resolution may be inadequate for any associated control systems using steering angle as an input (e.g., a vehicle stability control system).

When low resolution is not a problem, an EPAS motor Hall-effect sensor can be used in combination with a marker coupled to the steering system (e.g., a single position pulse at a reference position, such as the center position), as shown in U.S. Pat. No. 6,364,050, issued to Horton. To remove ambiguity from the EPAS motor position signal, transitions in the output of the motor position sensor are counted and the count is reset whenever an index signal is produced from the steering shaft sensor indicative of the steering assembly position being in the straight ahead (i.e., center) position for the vehicle. The index signal can be provided from a geared steering column sensor, a steering rack sensor, or a yaw rate sensor adapted to produce an output indicative of the yaw rate of the vehicle.

The counting of transitions is comprised of incrementing the count signal when the Hall-effect sensor output changes state corresponding to rotation in one direction, and decrementing the count signal when a change of state occurs corresponding to rotation in the opposite direction. The value of the count is therefore indicative of the angular position of the steering shaft relative to the known angular position at which the reset by the center position index marker occurs.

It is desirable to maintain the contents of the counter even when the vehicle ignition is turned off and the EPAS system would usually be de-powered. If the count was lost, then the absolute steering angle would not be known on the next driving cycle until an index signal was received. In addition, the steering angle may be changed while the ignition is off, resulting in an inaccurate count unless the sensor continues to be monitored. Therefore, the position sensing system included means adapted to "strobe" or periodically energize the motor position Hall-effect sensors and to sample the output of the sensing means when energized. The sensors may then be de-energized between samples (this is often referred to as sleep mode). This minimizes the average current drain compared to running the sensors continuously while enabling the counter to keep track of the steering shaft position even when the vehicle ignition switch is turned off without draining the vehicle battery excessively. A latch may be provided to latch the sampled value.

In the event of a dead main battery or other loss of power to the EPAS system, the latched value of the Hall counter may be lost, resulting in ambiguity of the absolute steering angle. After the dead battery is replaced, absolute position is nevertheless restored when the steering angle passes through the center position and the index marker is detected. It would be desirable, however, if system cost could be reduced by eliminating the index sensor and its associated wiring.

Where higher resolution measurement of steering angle is needed, it is known to utilize a high resolution angular position sensor either mounted directly on the steering shaft or connected thereto via a gear drive. This produces an output which does not depend on the EPAS gearbox ratio since it reads directly from the steering shaft, but is expensive to produce.

As shown in prior U.S. Pat. No. 6,354,396, issued to Horton et al, a motor position sensor can be used to assist a steering shaft position sensor in the determination of the position of the steering angle in order to overcome ambiguity in finding an absolute reference position. A motor position sensor comprising a Hall-effect sensor having a relatively coarse resolution is combined with a position sensor on the steering shaft. The motor is coupled to the steering shaft through a gearbox having a non-integer reduction gear ratio so that position signals from the two sensors are not synchronous and their relative phases identify the particular revolution of the steering shaft.

The resolution obtainable with Hall-effect sensors of reasonable cost may be insufficient for some motor control purposes. Prior application WO9908374A1, in the name of Wilson-Jones et al, teaches the use of a high resolution sensor on the steering shaft in order to increase the resolution of measuring the motor rotor position between the positions detected by a Hall-effect sensor. As previously mentioned, it would be an advantage to avoid the cost of a high resolution position sensor on the steering shaft.

Electronically commutated motors are known that internally incorporate position sensors that provide a higher resolution than can be easily achieved with Hall-effect sensors. For example, U.S. Pat. No. 5,625,239, issued to Persson et al, teaches an inductive sensor providing high resolution within each electrical cycle of motor rotation. Since the position sensor is formed integrally with the motor, it can be fabricated and installed more cheaply that a separate, steering shaft mounted high resolution position sensor. However, there are typically several electrical cycles within one full mechanical rotation of the rotor, so that the position derived from the inductive sensor is ambiguous with respect to the mechanical position. It is, however, sufficient for motor control purposes since the position within an electrical cycle is not ambiguous.

SUMMARY OF THE INVENTION

The present invention has the advantage of maintaining an accurate absolute steering angle without requiring a reference position sensor to provide an index marker signal. In addition, the present invention avoids the need for any high resolution sensor outside of the EPAS electric motor.

An inductive sensor (or other resolver) within the electric motor (e.g., having an angular resolution of about 60 resolved positions within each electrical cycle of the motor) is combined with a Hall-effect sensor on the electric motor having a measuring range greater than one electrical cycle (but not necessarily a full mechanical rotation). A factory calibrated center steering position (in terms of the state of the Hall-effect sensor and an inductive sensor position counter) is stored by an EPAS controller. By counting both the Hall-state transitions and the inductive sensor pulses relative to the stored center position, a sufficiently accurate steering angle can be maintained.

In the event of loss of power to the EPAS system causing the latched value of the Hall counter to be lost, no index marker is available in the present invention since the absolute reference sensor has been eliminated. Instead, an absolute reference is restored based on deriving an estimated center steering position dynamically determined by a vehicle stability control system during subsequent operation of the vehicle. The estimated center steering position is matched to the calibrated center steering position from a nonvolatile memory and the position counter is reset.

Thus, in one aspect of the invention, a method is provided for maintaining an absolute steering angle of a steering assembly in a vehicle including an electric power assist steering (EPAS) system, wherein the steering assembly has a steering angle over a range of angles including a center steering position and wherein the EPAS system includes an electric motor for applying torque to the steering assembly. The electric motor passes through a plurality of rotations over said range of angles of the steering assembly and includes a rotational position sensor for determining an instantaneous rotational position of the electric motor at a first resolution within a current electrical cycle of the electric motor and a Hall-effect sensor for sensing rotation past predetermined rotational positions of the electric motor at a second resolution lower than the first resolution. The Hall-effect sensor generates a predetermined transition of Hall states with a measuring range greater than the electrical cycle. In this method, the steering assembly is located at a steering angle corresponding to the center steering position in a controlled calibration. An instantaneous one of said Hall states and an instantaneous rotational position within an electrical cycle are stored in nonvolatile memory corresponding to a calibrated center steering position during the calibration. An electrical cycle position counter is incremented in response to the predetermined transition of Hall states. An instantaneous steering angle is maintained relative to the center steering position in response to the electrical cycle position counter and the instantaneous rotational position within an electrical cycle.

In another aspect of the invention, a method is provided for recovering a center steering position of a steering assembly in a vehicle including an electric power assist steering (EPAS) system and a vehicle stability control (VSC) system. The steering assembly has a steering angle over a range of angles including a center steering position. The EPAS system includes an electric motor for applying torque to the steering assembly. The electric motor passes through a plurality of rotations over the range of angles of the steering assembly and it includes a rotational position sensor for determining an instantaneous rotational position of the electric motor and for providing a rotation signal to a position counter for maintaining a steering angle indication. The VSC system is capable of dynamically determining an estimated center steering position of the steering assembly. In the inventive method, the steering assembly is located at a steering angle corresponding to the center steering position in a controlled calibration. An instantaneous rotational position of the electric motor is stored in nonvolatile memory corresponding to a calibrated center steering position during the calibration. The position counter keeps a count during operation of the vehicle to maintain the steering angle indication with reference to the calibrated center steering position. A loss of power to the position counter resulting in loss of the steering angle indication is detected. After restoration of power, the estimated center steering position having been dynamically determined by the VSC system is obtained during subsequent operation of the vehicle. The estimated center steering position is matched to the calibrated center steering position from the nonvolatile memory. The position counter is updated in response to the estimated center steering position. Operation of the position counter is then resumed to maintain the steering angle indication.

DETAILED DESCRIPTION OF PREFERRED EMBODIMENTS

Figure 1:
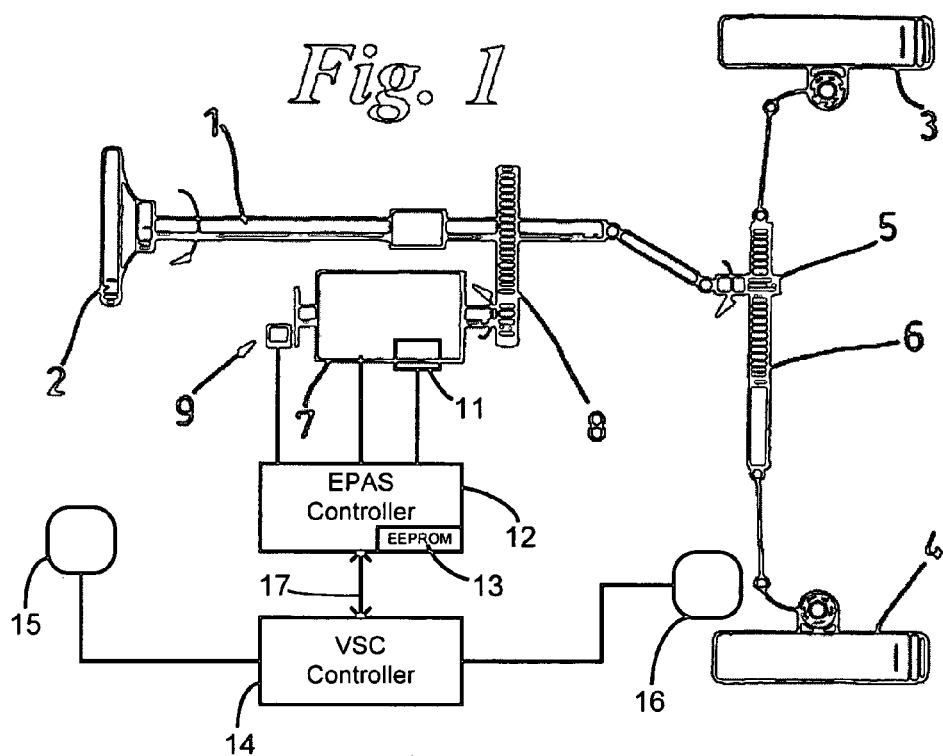
FIG. 1 is a schematic illustration of an electrical power assist steering system.
Figure 2:
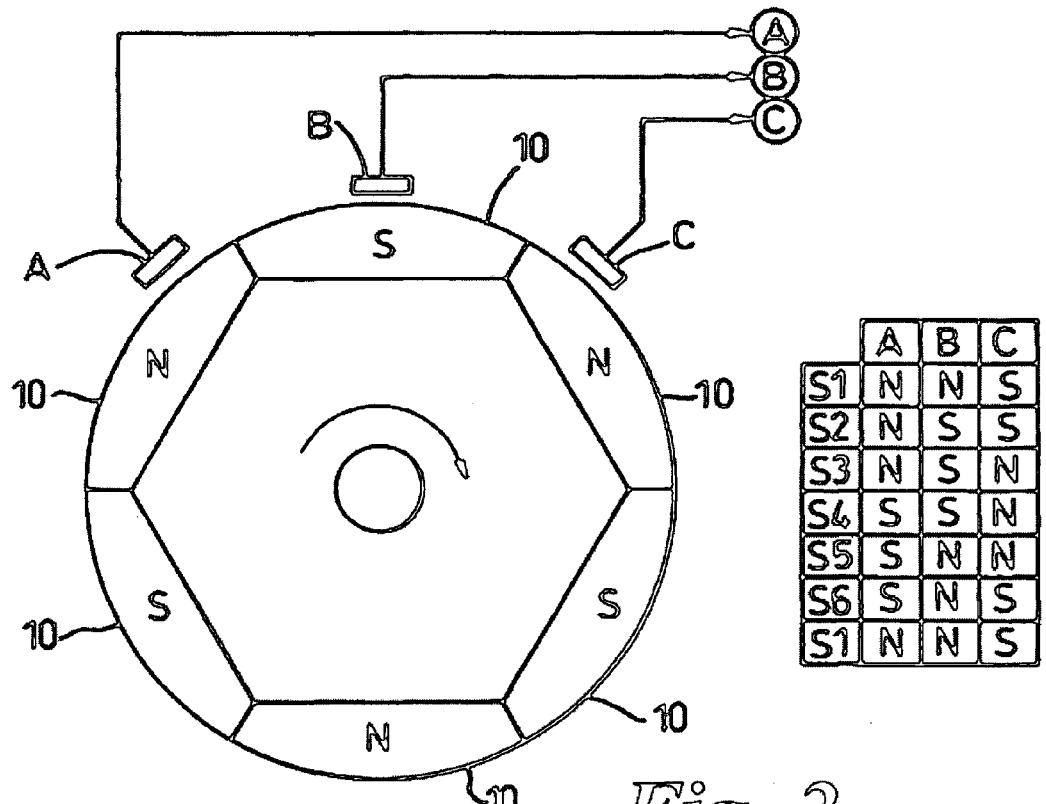
FIG. 2 is a diagram of an arrangement of Hall effect sensors mounted around a 6-pole rotor of a brushless DC motor.

Referring now to FIG. 1, a steering shaft 1 is operatively connected at one end to a steering wheel 2 and at its opposing end to a pair of road wheels 3 and 4 through a rack and pinion gearbox 5 and 6. In order to provide torque assistance to the driver, the system further includes an electric motor 7 connected to the steering shaft 1 through a reduction gearbox 8. Motor 7 may, for example, comprise a 3-phase permanent magnet brushless motor with a sensing means 9 comprising three Hall effect sensors A, B, and C arranged around the motor 7 to detect the electrical angle of the rotor by measuring the position of rotor magnets 10. The spacing of Hall effect sensors A, B, and C and the number of north/south magnet pairs deployed around the circumference must be sufficiently numerous to differentiate between different electrical cycles of motor 7 within 360° of mechanical rotation.

Motor 7 further includes an inductive position sensor 11 for measuring rotor position within one electrical cycle of motor 7. An inductive sensor as described in U.S. Pat. No. 5,625,239 is suitable for this purpose. Sensor 11 is designed to provide a predetermined resolution within each electrical cycle as is required for proper motor commutation or for providing a desired resolution in a detected steering angle (e.g., for use by the EPAS system to provide a center-restoring torque or by other control systems controlling various performance aspects of the vehicle).

An EPAS controller 12 receives Hall effect signals and inductive sensor signals and provides commutation signals to control rotation of motor 7. An electrically erasable programmable read only memory (EEPROM) 13 is provided within EPAS controller 12 for storing a Hall state and inductive sensor position corresponding to a calibrated center position as will be described below.

A vehicle stability control system shown in FIG. 1 includes a VSC controller 14, a VSC sensor 15 (such as a yaw sensor, a speed sensor, and a steering sensor), and a VSC actuator 16 (such as a brake actuator). The VSC system senses vehicle operation and automatically applies braking forces to improve vehicle stability and reduce understeer and oversteer, for example. Prior art VSC systems have often used steering angle sensors that provided relative rotation information without an absolute reference position signal. Thus, VSC systems have been developed that dynamically determine a center steering angle (i.e., zero position) based on sensed parameters used by the VSC system, such as yaw rate and speed. Although various algorithms for quickly determining a zero position have been developed, the estimation of center position by the VSC system lacks precision. As described below, however, the VSC-derived center position can be precise enough to allow a true, calibrated center position to be recovered as identified by a recorded position of the EPAS motor sensor(s).

EPAS controller 12 and VSC controller 14 are coupled together by a bus 17, such as a multiplex bus (e.g., the controller area network, or CAN bus), over which they share data and control signals. For example, EPAS controller 12 can provide steering angle information to VSC controller 14. In particular, the detected zero position from the VSC system is communicated to the EPAS system as part of a recovery of the more accurate, factory-calibrated center position.

Figure 3:
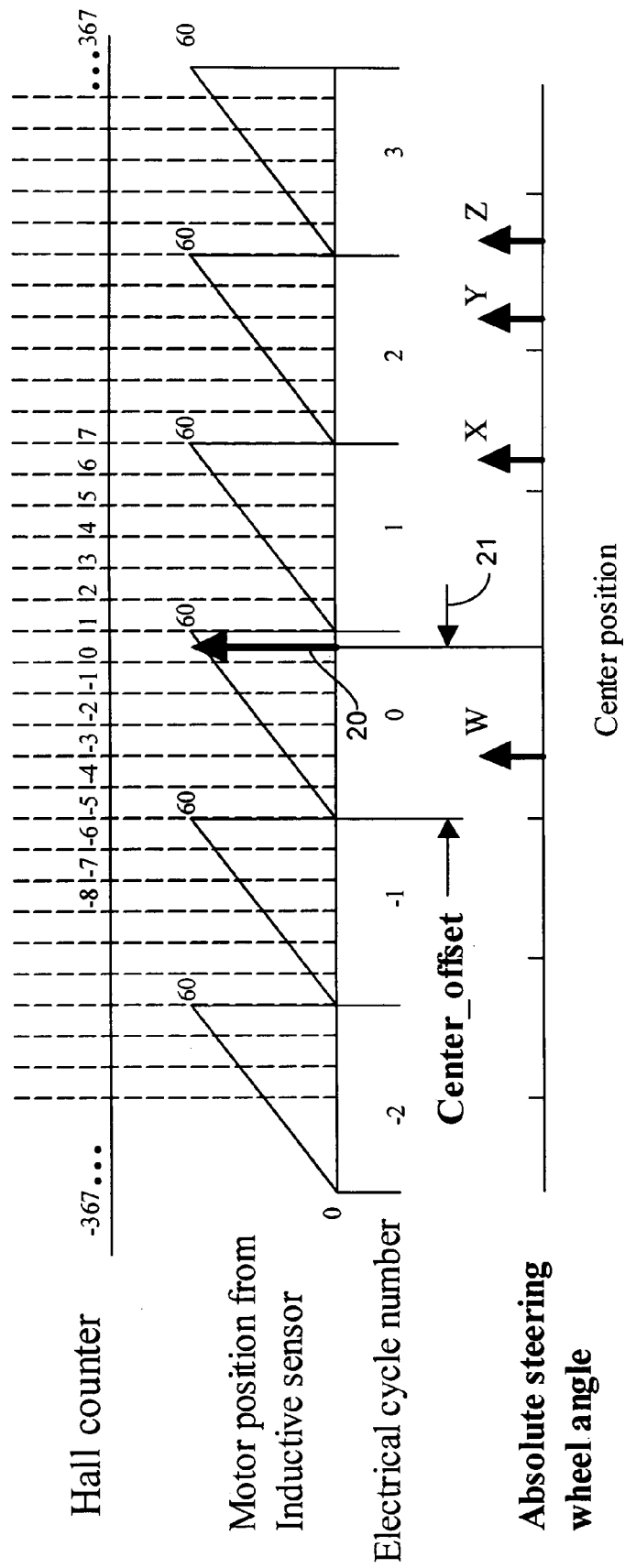
FIG. 3 is a diagram showing the relationship of a Hall counter and an inductive sensor signal for determining an absolute steering wheel angle as used in the present invention.

FIG. 3 shows the contents of a Hall counter and a position signal output from the inductive sensor over a range of absolute steering wheel angles. In this example, the higher resolution rotation signal from the inductive sensor is a digital signal that varies in value from 1 to 60 mechanical degrees over each electrical cycle of the electric motor (in this example there are six electrical cycles per mechanical revolution). The Hall sensors are arranged to provide Hall state transitions such that any particular Hall state does not repeat in consecutive electrical cycles. In the present example, there are six distinct Hall states and one electrical cycle corresponds to six Hall transitions. This relationship depends on the number of motor poles and the placement of the Hall sensors.

An arrow 20 corresponds to a true center steering angle. The electrical cycle in which the center steering angle falls is labeled as cycle number zero and other cycles are numbered relative to cycle number zero as shown. The value of the inductive sensor signal at the center position provides a center offset value 21, which in this example has a value of 55.

During normal operation, the Hall counter is set to zero during the Hall state that corresponds to the true center steering angle. As Hall state transitions are detected, the Hall counter is incremented or decremented according to the particular Hall state detected. The maximum positive and negative values of the Hall counter depend upon the number of Hall states within 360° of motor rotation and the gear ratio of reduction gearbox 8. In the present example, when properly synchronized to the true center steering angle, the Hall counter has valid values between about −367 and +367.

The value of the properly synchronized Hall counter uniquely identifies the current electrical cycle number. The absolute steering wheel angle is determined from the equation:

$$\text{angle} = (C \times 60 + P - \text{offset})/R$$

where C is electrical cycle number, P is the value of the motor position signal from the inductive sensor, offset is the center offset value, and R is the gear ratio. In the current example, offset has a value of 55 and R is given a value of about 9.4.

Figure 4:
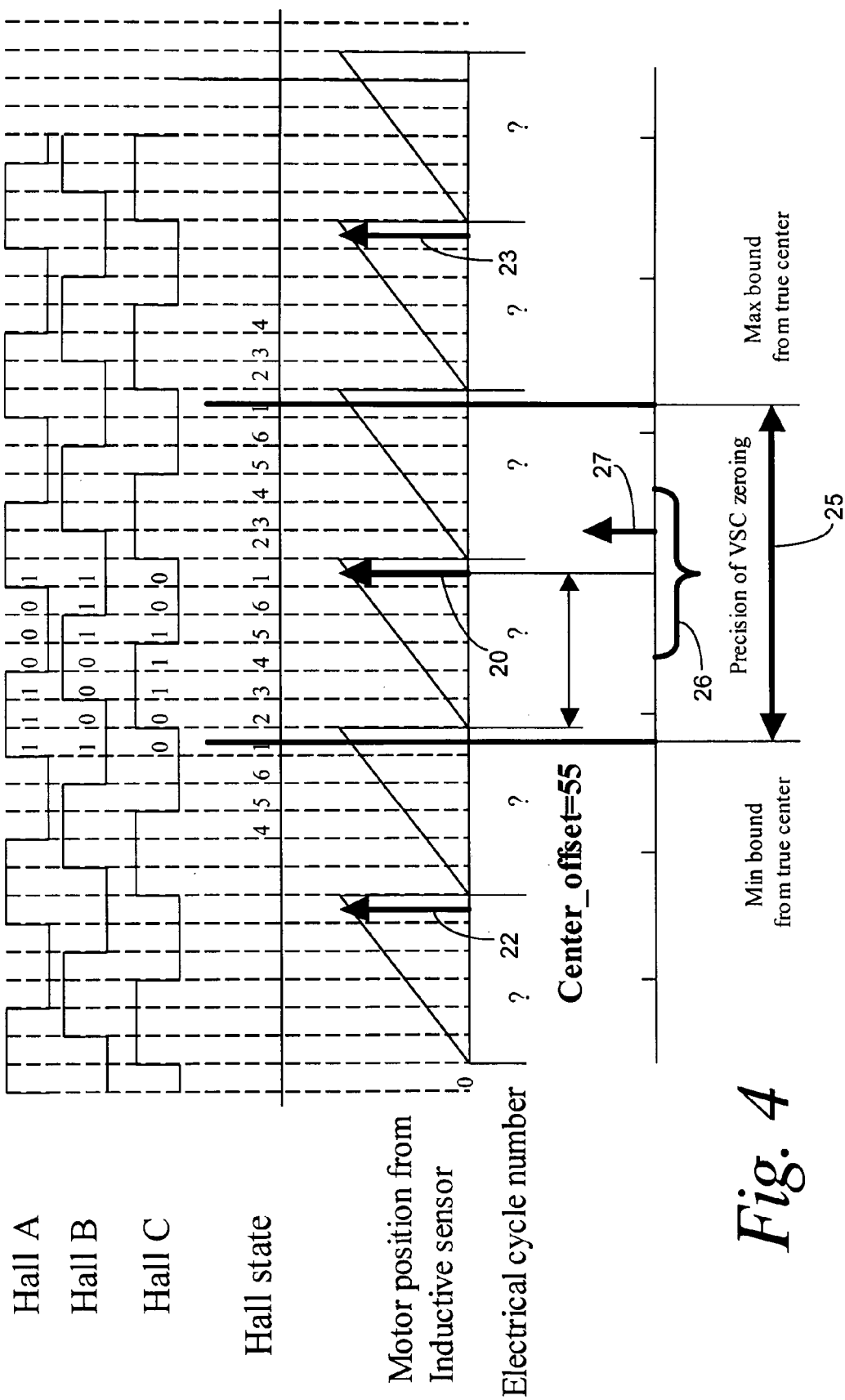
FIG. 4 is a diagram showing how a stored Hall state and a stored inductive sensor position signal are utilized by the present invention to recapture a center steering position following a dead battery condition.

When the value stored in the Hall counter is lost due to a dead battery or other condition that causes loss of power to the EPAS controller, the correct cycle number cannot be determined from the output of the Hall sensors. FIG. 4 illustrates the technique of the present invention to recover synchronization of the Hall counter from stored values of the Hall state and inductive motor position and an approximate center steering angle from the VSC system. When battery power is restored, the Hall sensors and the inductive sensor can be immediately read to determine the Hall state and the motor position. The center steering angle of 0° is known to occur during a Hall state of "110" and a motor position of "55". However, an electrical cycle number relative to the center steering angle cannot be determined because the steering angles indicated by arrows 22 and 23 (and many others not shown) correspond to the same Hall state and motor position.

A range 25 is shown which spans from one cycle less to one cycle more than the correct center steering angle. If an estimated center position can be identified within range 25, then electrical cycle number zero can be uniquely identified and the true, calibrated center steering angle can be recovered after a dead battery. The VSC system needs a steering angle zeroing accuracy within a range 26 of about one electrical cycle. Thus, an estimated VSC center steering position 27 may be obtained from the VSC system and then the Hall counter is set such that its zero count corresponds to arrow 20 (thereby re-establishing the correct electrical cycle numbers).

Figure 5:
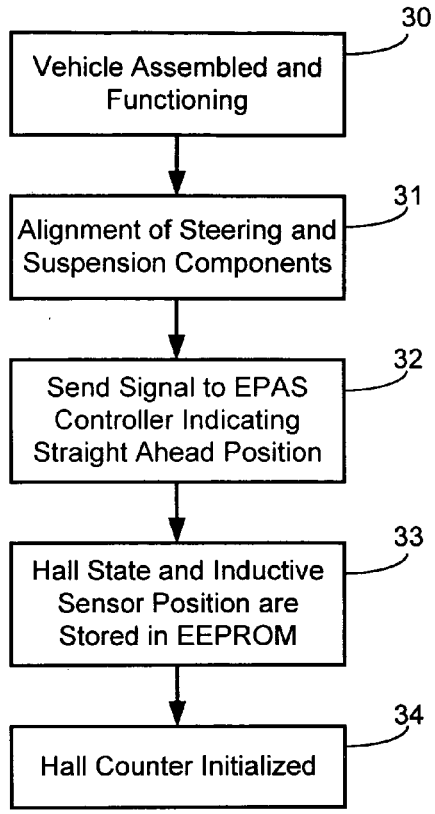
FIG. 5 is a flowchart showing a calibration and initialization procedure of the present invention.

A preferred embodiment of calibration and storing of center position information according to the present invention is shown in FIG. 5. In step 30, a vehicle having an EPAS system and a VSC system is assembled into a functional unit (i.e., the mechanical and electrical systems used by the present invention are activated). In step 31, a conventional alignment of steering and suspension components is performed. For example, the wheels are aligned and then tie-rods and other components are adjusted to orient the steering wheel with a desired orientation. At a moment when adjustments have been made and the steering system is being held in its straight-ahead, zero steering angle position, a control signal is sent to the EPAS controller in step 32 (e.g., via an auxiliary connection to the multiplex bus or via a direct connection). The signal may be in response to an operator action such as activation of a control switch. In response to the control signal in step 33, the EPAS controller stores the Hall state and the inductive sensor motor position (i.e., the center offset) in nonvolatile memory, such as an EEPROM. In step 34, the Hall counter is initialized (e.g., set to zero) while the steering angle is in the center position.

During the life of a vehicle, whenever maintenance is performed that affects the calibration of the center steering position then the control signal is generated during the maintenance in order to store new values of the Hall state and inductive motor position.

Figure 6:
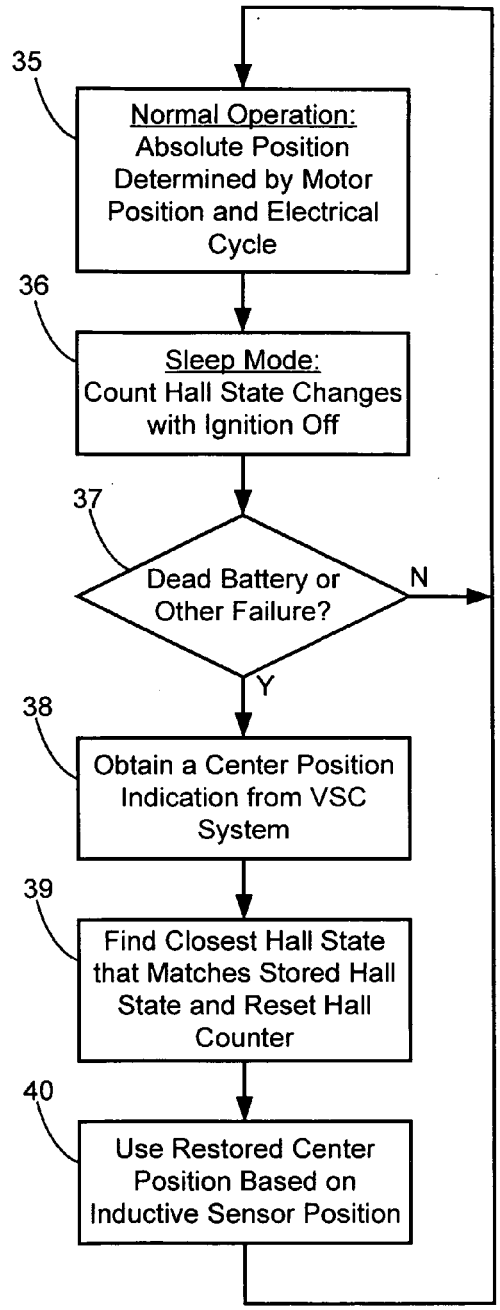
FIG. 6 is a flowchart showing in-service operation of the present invention.

Once the vehicle is put into service, normal operation begins in step 35 of FIG. 6. Absolute steering angle is determined based on motor position within an electrical cycle as determined by the inductive sensor and the electrical cycle number within the full steering range as determined by the Hall counter. When the vehicle ignition switch is turned off, then a sleep mode is entered in step 36. During sleep mode, the Hall sensors are periodically energized to detect the Hall state and to update the Hall counter in the event of steering angle changes with the vehicle ignition off.

In step 37, the invention decides whether there has been a dead battery or other power failure or loss or corruption of the contents of the Hall counter. Such loss can occur during normal operation or during sleep mode. When a power loss is detected, center position is recovered using the method of steps 38-40. Rather than an explicit check for a power loss, steps 38-40 can be part of a power-up routine performed by the EPAS controller every time power is first applied.

In step 38, a center position indication is obtained from the VSC system. This may be comprised of a control signal or flag sent over the multiplex bus to indicate in real time that the VSC system has estimated that the instantaneous steering angle is zero at the time the control signal or flag is sent. For example, the VSC system determines when the vehicle is traveling in a straight line when yaw rate is low and speed is high for a predetermined period of time. The VSC system may continue to refine an estimate of center steering position until it is known to be within the required accuracy and then signals the EPAS system.

In step 39, the EPAS system finds the closest Hall state to the currently sensed Hall state that matches the Hall state that is stored in non-volatile memory. It resets the Hall counter so that the electrical cycle number zero is then identified. In step 40, a restored or resynchronized center steering position is obtained based on the center offset also stored in non-volatile memory. A return is made to step 35 for providing normal operation.

What is claimed is:

1. A method of maintaining an absolute steering angle of a steering assembly in a vehicle including an electric power assist steering (EPAS) system, wherein said steering assembly has a steering angle over a range of angles including a center steering position, wherein said EPAS system includes an electric motor for applying torque to said steering assembly, wherein said electric motor passes through a plurality of rotations over said range of angles of said steering assembly, wherein said electric motor includes a rotational position sensor for determining an instantaneous rotational position of said electric motor at a first resolution within a current electrical cycle of said electric motor, and wherein said electric motor includes a Hall-effect sensor for sensing rotation past predetermined rotational positions of said electric motor at a second resolution lower than said first resolution, said Hall-effect sensor generating a predetermined transition of Hall states with a measuring range greater than said electrical cycle, said method comprising the steps of:

locating said steering assembly at a steering angle corresponding to said center steering position in a controlled calibration;

storing in nonvolatile memory an instantaneous one of said Hall states and said instantaneous rotational position within an electrical cycle corresponding to a calibrated center steering position during said calibration;

incrementing an electrical cycle position counter in response to said predetermined transition of Hall states; and maintaining an instantaneous steering angle relative to said center steering position in response to said electrical cycle position counter and said instantaneous rotational position within an electrical cycle.

2. The method of claim 1 wherein said instantaneous steering angle is determined in response to a value of:

$$(C \times T + P - \text{offset})/R$$

where C is a current value in said electrical cycle position counter, T is a total number of said rotational positions at said first resolution within an electrical cycle, P is a current value of said rotational position within an electrical cycle, offset is said rotational position within an electrical cycle of said stored calibrated center steering position, and R is a gear reduction ratio at which said electric motor is connected to said steering assembly.

3. An electric power assist steering (EPAS) system for a vehicle, said vehicle including a steering assembly providing a steering angle over a range of angles including a straight-ahead center steering position, said EPAS system comprising:

an electric motor for applying torque to said steering assembly, wherein said electric motor passes through a plurality of rotations over said range of angles of said steering assembly, wherein said electric motor includes an inductive position sensor for generating pulses indicative of a rotational position of said electric motor within an electrical cycle at a first resolution, and wherein said electric motor includes a Hall-effect sensor for sensing rotation past predetermined rotational positions of said electric motor at a second resolution lower than said first resolution, said Hall-effect sensor generating a predetermined transition of Hall states with a measuring range greater than said electrical cycle; and a controller for maintaining a steering angle indication, said controller including a nonvolatile memory for storing an instantaneous rotational position of said electric motor corresponding to a calibrated center steering position during a calibration process which locates said steering assembly at a steering angle corresponding to said center steering position, said controller including a position counter incremented in response to said predetermined transition of Hall states and maintaining an instantaneous steering angle relative to said center steering position in response to said position counter and said rotational position within an electrical cycle.

4. A method of recovering center steering position of a steering assembly in a vehicle including an electric power assist steering (EPAS) system and a vehicle stability control (VSC) system, wherein said steering assembly has a steering angle over a range of angles including a center steering position, wherein said EPAS system includes an electric motor for applying torque to said steering assembly, wherein said electric motor passes through a plurality of rotations over said range of angles of said steering assembly, wherein said electric motor includes a rotational position sensor for determining an instantaneous rotational position of said electric motor and for providing a rotation signal to a position counter for maintaining a steering angle indication, and wherein said VSC system dynamically determines an estimated center steering position of said steering assembly, said method comprising the steps of:

locating said steering assembly at a steering angle corresponding to said center steering position in a controlled calibration;

storing in nonvolatile memory an instantaneous rotational position of said electric motor corresponding to a calibrated center steering position during said calibration;

operating said position counter during operation of said vehicle to maintain said steering angle indication with reference to said calibrated center steering position;

detecting a loss of power to said position counter resulting in loss of said steering angle indication;

after restoration of said power, then obtaining said estimated center steering position having been dynamically determined by said VSC system during subsequent operation of said vehicle;

matching said estimated center steering position to said calibrated center steering position from said nonvolatile memory;

updating said position counter in response to said estimated center steering position; and resuming operation of said position counter to maintain said steering angle indication.

5. The method of claim 4 wherein said controlled calibration is performed during original manufacture of said vehicle.

6. The method of claim 4 wherein said nonvolatile memory is comprised of an EEPROM.

7. The method of claim 4 wherein said rotational position sensor of said electric motor comprises a first position sensor and a second position sensor, wherein said first position sensor provides first position signals that distinguish between electrical cycles of said electric motor, wherein said second position sensor provides higher resolution rotation signals within each of said electrical cycles, wherein said first position signals are counted by said position counter, and wherein said steering angle indication is determined in response to said position counter and said higher resolution rotation signals.

8. The method of claim 7 wherein said first position sensor is comprised of an array of Hall-effect sensors detecting rotation of said electric motor with respect to predetermined reference points, and wherein said second position sensor is comprised of an inductive sensor for detecting rotation at said higher resolution.

9. The method of claim 8 wherein said instantaneous rotational position stored in said nonvolatile memory is comprised of states of said Hall-effect sensors and said higher resolution rotation signal at said calibrated center steering position.

10. Vehicle apparatus comprising:

a steering assembly providing a steering angle over a range of angles including a straight-ahead center steering position;

a vehicle stability control (VSC) system that dynamically determines an estimated center steering position of said steering assembly in response to sensed parameters during actual driving of said vehicle apparatus;

an electric power assist steering (EPAS) system including an electric motor for applying torque to said steering assembly, wherein said electric motor passes through a plurality of rotations over said range of angles of said steering assembly and wherein said electric motor includes a rotational position sensor for determining an instantaneous rotational position of said electric motor and for providing a rotation signal; and a controller for maintaining a steering angle indication, said controller including a nonvolatile memory for storing an instantaneous rotational position of said electric motor corresponding to a calibrated center steering position during a calibration process which locates said steering assembly at a steering angle corresponding to said center steering position, said controller including a position counter receiving said rotation signal and maintaining a count corresponding to an instantaneous steering angle relative to said center steering position, said controller including a power-loss detector for detecting a loss of power resulting in loss of said steering angle indication, and wherein, after restoration of power, said controller receives said estimated center steering position from said VSC system, matches said estimated center steering position to said calibrated center steering position from said nonvolatile memory, updates said position counter in response to said estimated center steering position, and resumes operation of said position counter to maintain said steering angle indication.

11. The vehicle apparatus of claim 10 wherein said rotational position sensor of said electric motor comprises a first position sensor and a second position sensor, wherein said first position sensor provides first position signals that distinguish between electrical cycles of said electric motor, wherein said second position sensor provides higher resolution rotation signals within each of said electrical cycles, wherein said first position signals are counted by said position counter, and wherein said steering angle indication is determined in response to said position counter and said higher resolution rotation signals.

12. The vehicle apparatus of claim 11 wherein said first position sensor is comprised of an array of Hall-effect sensors detecting rotation of said electric motor with respect to predetermined reference points, and wherein said second position sensor is comprised of an inductive sensor for detecting rotation at said higher resolution.

13. The vehicle apparatus of claim 12 wherein said instantaneous rotational position stored in said nonvolatile memory is comprised of states of said Hall-effect sensors and said higher resolution rotation signal at said calibrated center steering position.

14. The vehicle apparatus of claim 10 wherein said nonvolatile memory is comprised of an EEPROM.

15. An electric power assist steering (EPAS) system for a vehicle, said vehicle including a steering assembly providing a steering angle over a range of angles including a straight-ahead center steering position and a vehicle stability control (VSC) system that dynamically determines an estimated center steering position of said steering assembly in response to sensed parameters during actual driving of said vehicle, said EPAS system comprising:

an electric motor for applying torque to said steering assembly, wherein said electric motor passes through a plurality of rotations over said range of angles of said steering assembly and wherein said electric motor includes a rotational position sensor for determining an instantaneous rotational position of said electric motor and for providing a rotation signal; and a controller for maintaining a steering angle indication, said controller including a nonvolatile memory for storing an instantaneous rotational position of said electric motor corresponding to a calibrated center steering position during a calibration process which locates said steering assembly at a steering angle corresponding to said center steering position, said controller including a position counter receiving said rotation signal and maintaining a count indicating an instantaneous steering angle relative to said center steering position, said controller including a power-loss detector for detecting a loss of power resulting in loss of said steering angle indication, and wherein, after restoration of power, said controller receives said estimated center steering position from said VSC system, matches said estimated center steering position to said calibrated center steering position from said nonvolatile memory, updates said position counter in response to said estimated center steering position, and resumes operation of said position counter to maintain said steering angle indication.

16. The vehicle apparatus of claim 15 wherein said rotational position sensor of said electric motor comprises a first position sensor and a second position sensor, wherein said first position sensor provides first position signals that distinguish between electrical cycles of said electric motor, wherein said second position sensor provides higher resolution rotation signals within each of said electrical cycles, wherein said first position signals are counted by said position counter, and wherein said steering angle indication is determined in response to said position counter and said higher resolution rotation signals.

17. The vehicle apparatus of claim 16 wherein said first position sensor is comprised of an array of Hall-effect sensors detecting rotation of said electric motor with respect to predetermined reference points, and wherein said second position sensor is comprised of an inductive sensor for detecting rotation at said higher resolution.

18. The vehicle apparatus of claim 17 wherein said instantaneous rotational position stored in said nonvolatile memory is comprised of states of said Hall-effect sensors and said higher resolution rotation signal at said calibrated center steering position.

19. The vehicle apparatus of claim 15 wherein said nonvolatile memory is comprised of an EEPROM.

* * * * *